(12) United States Patent
Hayashi et al.

(10) Patent No.: US 12,403,960 B2
(45) Date of Patent: Sep. 2, 2025

(54) OUTER PANEL STRUCTURE

(71) Applicant: TOYOTA JIDOSHA KABUSHIKI KAISHA, Aichi-ken (JP)

(72) Inventors: Takanori Hayashi, Toyota (JP); Yosuke Otake, Ichinomiya (JP)

(73) Assignee: TOYOTA JIDOSHA KABUSHIKI KAISHA, Aichi-Ken (JP)

(*) Notice: Subject to any disclaimer, the term of this patent is extended or adjusted under 35 U.S.C. 154(b) by 372 days.

(21) Appl. No.: 18/301,997

(22) Filed: Apr. 18, 2023

(65) Prior Publication Data

US 2023/0331313 A1    Oct. 19, 2023

(30) Foreign Application Priority Data

Apr. 19, 2022  (JP) .................................. 2022-068586

(51) Int. Cl.

| | |
|---|---|
| *B60K 15/05* | (2006.01) |
| *B60L 53/16* | (2019.01) |
| *B62D 25/16* | (2006.01) |
| *B62D 25/18* | (2006.01) |
| *B62D 25/24* | (2006.01) |
| *B62D 27/02* | (2006.01) |

(52) U.S. Cl.
CPC .............. *B62D 25/18* (2013.01); *B60L 53/16* (2019.02); *B62D 25/163* (2013.01); *B62D 25/24* (2013.01); *B60K 15/05* (2013.01); *B60K 2015/053* (2013.01); *B60K 2015/0553* (2013.01)

(58) Field of Classification Search
CPC .. B60K 5/05; B60K 5/053; B60K 2015/0553; B62D 25/16; B62D 25/161; B62D 25/18; B62D 25/24; B62D 27/203
USPC .............................................. 296/198, 29, 30
See application file for complete search history.

(56) References Cited

U.S. PATENT DOCUMENTS

2017/0334287 A1    11/2017  Stack et al.
2024/0075824 A1*    3/2024  Shibata .............. H01R 13/7172

FOREIGN PATENT DOCUMENTS

JP        H08133126 A  *  5/1996
JP        5715708 B2       5/2015

OTHER PUBLICATIONS

JP8S133126 Text (Year: 1996).*

* cited by examiner

*Primary Examiner* — Dennis H Pedder
(74) *Attorney, Agent, or Firm* — HAUPTMAN HAM, LLP

(57) ABSTRACT

An outer panel structure includes a front fender panel, which is an outer panel, and a charging receiver module or fuel receiver module. The front fender panel is provided at a side part of a vehicle, and includes a frame part formed therein by having a part thereof perforated in a thickness direction. The charging receiver module or fuel receiver module is inserted and fixed in the frame part. The charging receiver module or fuel receiver module includes a lid that can be opened and closed. The outer panel structure further includes a reinforcement bracket mounted to the front fender panel at a part located below an opening/closing hinge axis of the lid in terms of a vehicle height direction.

2 Claims, 10 Drawing Sheets

OUTER PANEL STRUCTURE

CROSS REFERENCE TO RELATED APPLICATION

This application claims priority to Japanese Patent Application No. 2022-068586 filed on Apr. 19, 2022, which is incorporated herein by reference in its entirety including the specification, claims, drawings, and abstract.

TECHNICAL FIELD

The present specification discloses a vehicle outer panel structure.

BACKGROUND

An outer panel of a vehicle is formed to have an opening in a part thereof for installing a charging receiver module or a fuel receiver module. For example, in JP 5715708 B, an opening is provided in a front fender panel of an electric vehicle (BEV), and a charging receiver module is fitted in this opening.

At a time of charging or fueling, a lid, which is a cover member of the charging receiver module or the fuel receiver module, is opened. When a vehicle user or the like leans on the lid in the open state from above in a manner of, for example, using the lid as an armrest, a part of the outer panel located below a rotational axis of the lid may become deformed by being dented inward in a vehicle width direction.

In view of this, the present specification discloses an outer panel structure which can enhance rigidity of the part of the outer panel located below the lid.

SUMMARY

The present specification discloses an outer panel structure. This outer panel structure includes an outer panel, and a charging receiver module or fuel receiver module. The outer panel is provided at a side part of a vehicle, and includes a frame part formed therein by having a part thereof perforated in a thickness direction. The charging receiver module or fuel receiver module is inserted and fixed in the frame part. The charging receiver module or fuel receiver module includes a lid that can be opened and closed. The outer panel structure further includes a reinforcement bracket mounted to the outer panel at a part located below an opening/closing hinge axis of the lid in terms of a vehicle height direction.

When a downward load is applied to the lid in an open state, an inward load in a vehicle width direction is input to the outer panel in a region immediately below the opening/closing hinge axis. According to the above configuration, by mounting the reinforcement bracket in the region where this load is input, deformation in this region is suppressed.

In the above configuration, the bracket may include a support segment placed in contact with the outer panel, and a bead projecting in the vehicle width direction from the support segment. In that case, the bead includes a vertical bead extending in the vehicle height direction and a horizontal bead extending in the vehicle longitudinal direction.

According to the above configuration, by forming the bead on the bracket and thereby increasing rigidity, deformation in this part is suppressed. Further, when a downward load is applied to the lid in an open state, a load that works to cause an inwardly bending deformation (or denting deformation) in the vehicle width direction is input to the outer panel in a part located below the opening/closing hinge axis of the lid in terms of the vehicle height direction. The vertical bead extending in the vehicle height direction and the horizontal bead extending in the vehicle longitudinal direction, and in particular, side plates thereof, resist this bending load, and deformation of the outer panel is thereby suppressed.

In the above configuration, the outer panel may be a fender panel. In that case, the frame part is formed in a position above a tire. Further, the fender panel includes, as a structure located near the tire, a part having an L-shaped cross section, which includes a first plate portion facing the vehicle width direction and a second plate portion bent from the first plate portion. Furthermore, the bracket has an L-shaped cross section conforming along the first plate portion and the second plate portion.

According to the above configuration, since the bracket has an L-shaped cross section, a ridgeline is formed, which is a borderline between plate segments, so that resistance to load is increased as compared to the case where the bracket has a planar shape. Further, since the bracket has a shape conforming along the fender panel, interference with components around the fender panel is reduced.

According to the outer panel structure disclosed in the present specification, rigidity of the part of the outer panel located below the lid can be enhanced.

BRIEF DESCRIPTION OF DRAWINGS

Embodiment(s) of the present disclosure will be described based on the following figures, wherein.

DESCRIPTION OF EMBODIMENTS

An outer panel structure according to an embodiment will now be described by reference to the drawings. The shapes, materials, numbers of components, and numerical values described below are referred to simply by way of example, and can be changed as appropriate in accordance with specifications of the outer panel structure. Further, in the following description, identical elements are assigned the same reference signs in all of the drawings.

In FIGS. 1 to 9, in order to indicate positions and directions of elements, a rectangular coordinate system composed of an FR axis, an RW axis, and an UP axis is used. The FR axis is a vehicle longitudinal direction axis on which the vehicle front direction is the positive direction. The RW axis is a vehicle width direction axis on which the vehicle right direction is the positive direction. The UP axis is a vehicle vertical direction axis on which the vehicle upward direction is the positive direction.

<Overall Configuration>

Figure 1:
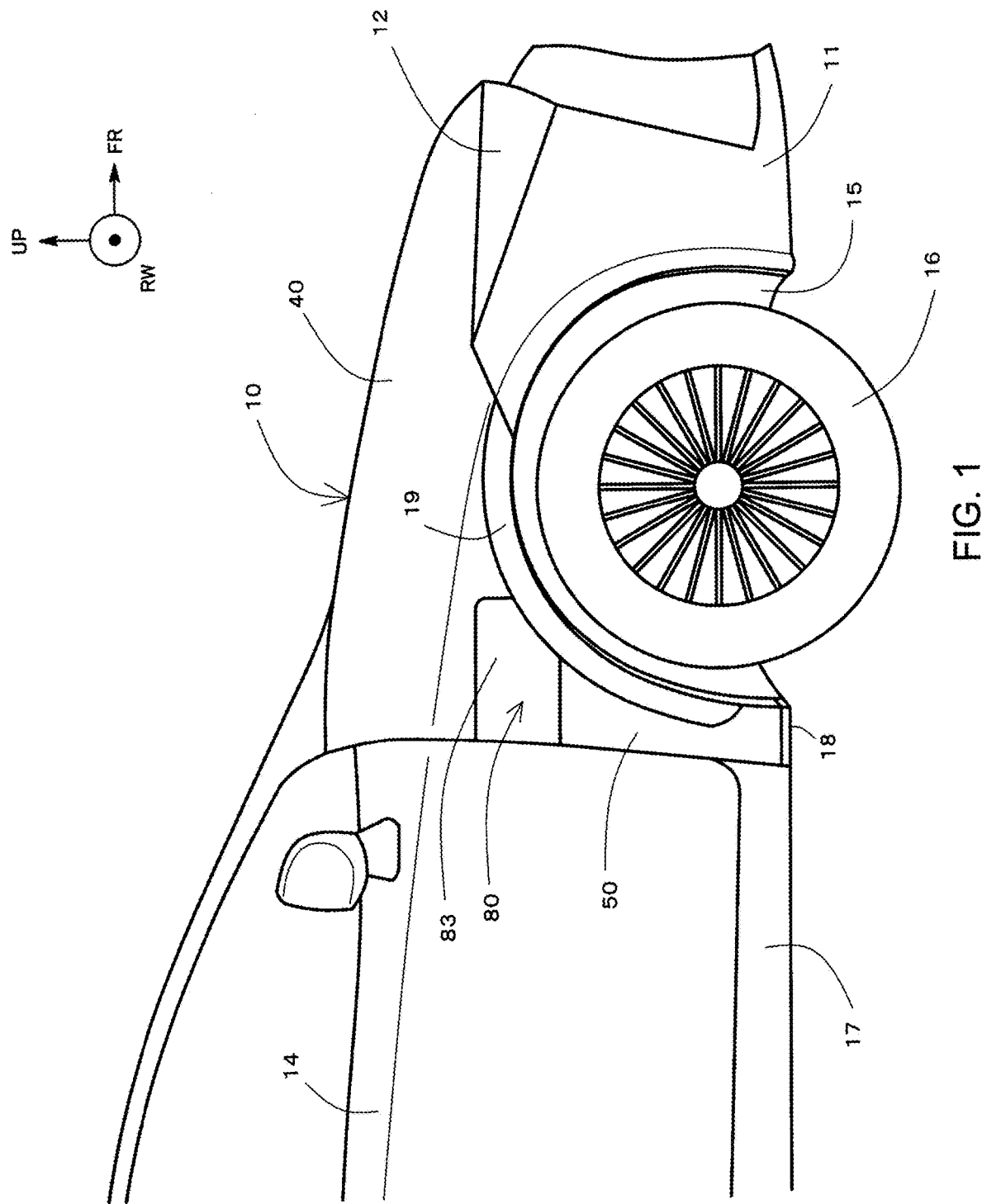
FIG. 1 is a side view showing, by way of example, a vehicle having an outer panel structure according to an embodiment.
Figure 7:
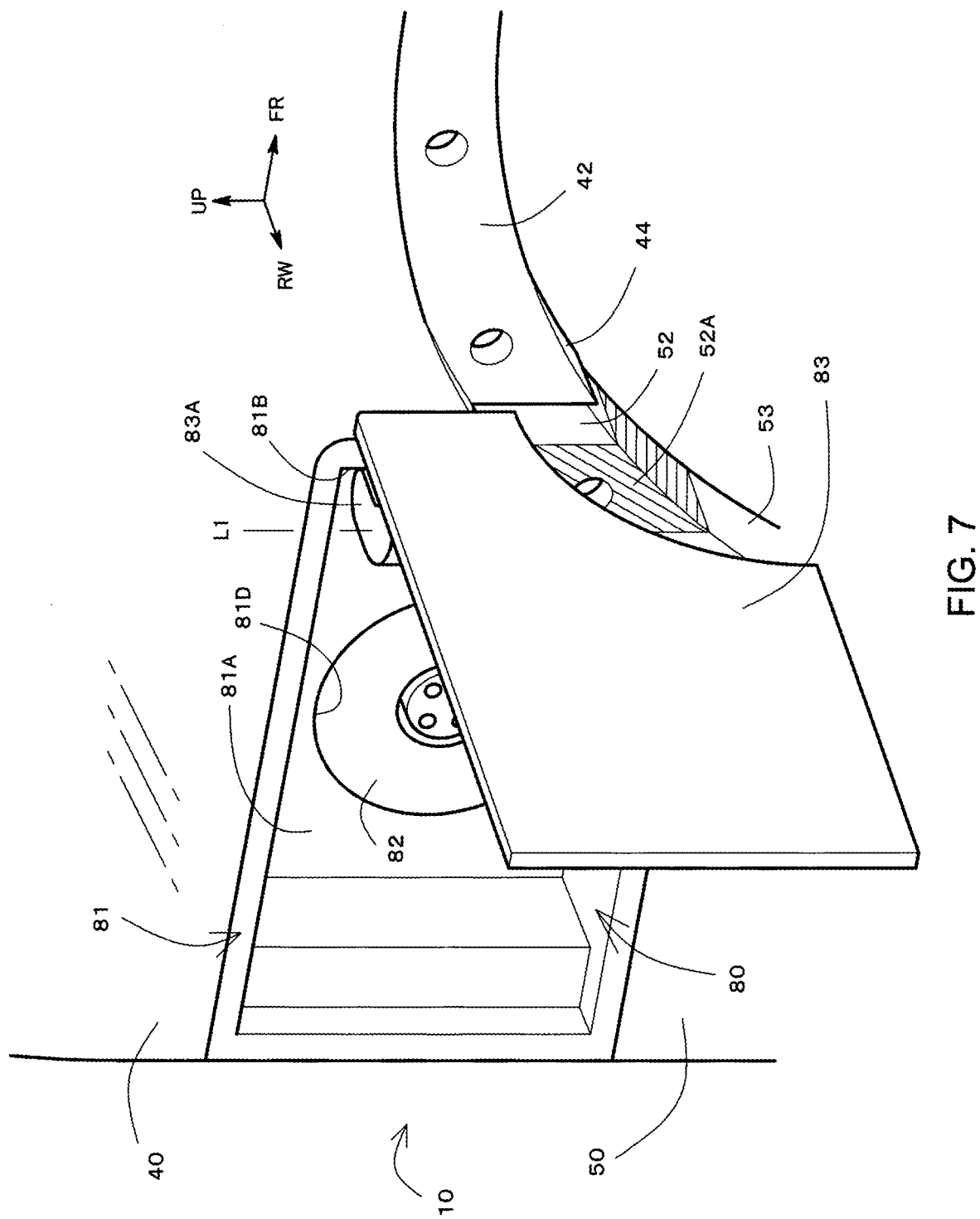
FIG. 7 is a perspective view illustrating a step (3 of 3) for mounting the charging receiver module to the front fender panel.
Figure 8:
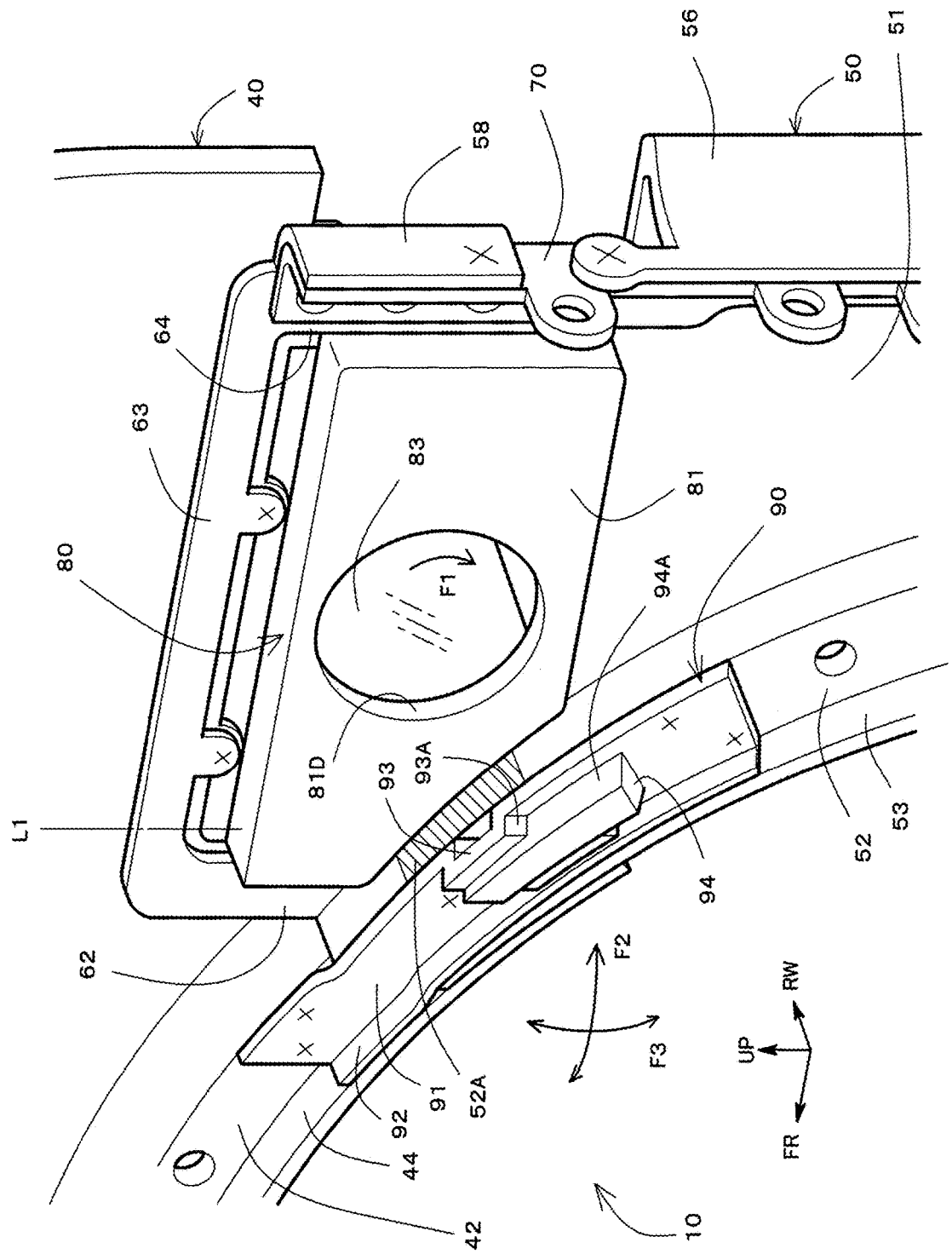
FIG. 8 is a perspective view of the front fender panel as seen from the same direction as that of FIG. 4, showing a state in which, in addition to a box and a lid of the charging receiver module, a bracket is mounted to the front fender.

Referring to FIG. 1, the outer panel structure according to the present embodiment is composed by including, for example, a front fender panel 10, a charging receiver module 80 (see FIG. 7), and a bracket 90 (see FIG. 8).

The front fender panel 10 is an outer panel member provided at a front side part of a vehicle, and is installed to cover a part above a front tire 16. The front fender panel 10 is located in front of a front door 14 and a rocker panel molding 17, and behind a headlamp 12 and a front bumper 11.

Figure 2:
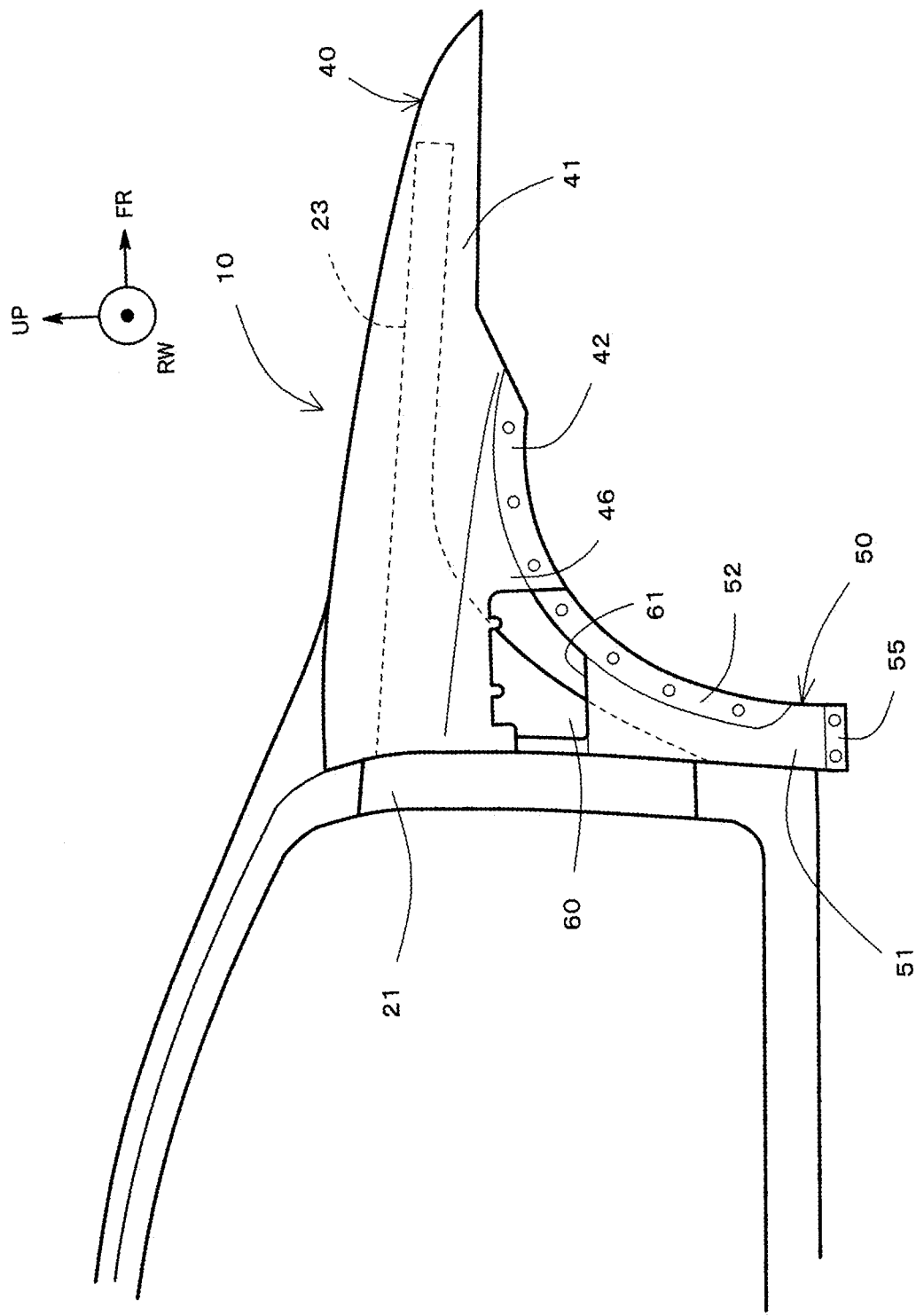
FIG. 2 is a side view showing, by way of example, a front fender panel, which is a part of the outer panel structure according to the embodiment, and a skeletal structure of a vehicle surrounding the front fender panel.

Referring to FIG. 2, the front fender panel 10 is fastened to and supported on a skeletal member of the vehicle. For example, an inward portion, in the vehicle width direction, of the front fender panel 10 is fastened to an apron upper member 23. A front end portion of the apron upper member 23 is connected to a radiator support (not shown in drawing). Further, a rear end portion of the front fender panel 10 is fastened to a front pillar lower part 21.

As will be described later, the front fender panel 10 is divided into two parts, namely, upper and lower parts. That is, the front fender panel 10 comprises a fender panel upper part 40 as an upper part of the divided member. Further, the front fender panel 10 comprises a fender panel lower part 50 as a lower part of the divided member. The detailed structure of these parts will be described later.

Referring to FIG. 1, the charging receiver module 80 is provided in the front fender panel 10. As shown in FIG. 7 described later, the charging receiver module 80 comprises a charging inlet 82, a box 81 that houses the charging inlet 82, and a lid 83 that can be opened and closed with respect to the box 81. The detailed structure of the charging receiver module 80 will be described later.

Referring to FIG. 2, a part of the front fender panel 10 is perforated in its thickness direction, and a frame part 61 is thereby formed. This frame part 61 provides a box opening 60 in which the charging receiver module 80 is inserted and fixed. For example, when viewed from a side face, the front fender panel 10 has a substantially triangular shape having a vertical size that increases from the front toward the rear. In consideration of such a structure, the frame part 61 is provided in, for example, a rear portion of the front fender panel 10 where the size allows relatively more room.

Referring to FIGS. 1 and 2, the frame part 61 is formed in a position above the front tire 16. For example, the frame part 61 has a shape in which a lower front part is cut off in an arcuate shape along an arcuate shape of the front fender panel 10.

Referring to FIG. 7, an opening/closing hinge axis L1 of the charging receiver module 80 is provided at a front part of the box 81. Further, on the front fender panel 10 at a part located below the opening/closing hinge axis L1 in terms of a vehicle height direction, flanges 42, 52 and flanges 44, 53 extending in an arcuate shape are provided.

With the flanges 42, 52 and the flanges 44, 53, a part having an L-shaped cross section is formed on the front fender panel 10. For example, faces of the flanges 42, 52 are oriented in the vehicle width direction, whereas the flanges 44, 53 face a tread surface of the front tire 16.

Regarding the structure of the front fender panel 10 in the vicinity of the front tire 16, when the flanges 42, 52 are assumed to be a first plate portion facing in the vehicle width direction, the flanges 44, 53 are recognized as a second plate portion bent from the first plate portion. In conformity with the L-shaped cross section formed by the first plate portion and the second plate portion, the reinforcement bracket 90 (see FIG. 8) is similarly formed to have an L-shaped cross section. With the bracket 90 reinforcing the part of the front fender panel 10 located below the opening/closing hinge axis L1 in terms of the vehicle height direction, when a downward load is applied to the lid 83, inwardly bending deformation (or denting deformation) in the vehicle width direction in that part is suppressed. Here, the bracket 90 may have a H-shaped cross section instead of the L-shaped cross section.

<Fender Panel Upper Part>

Figure 3:
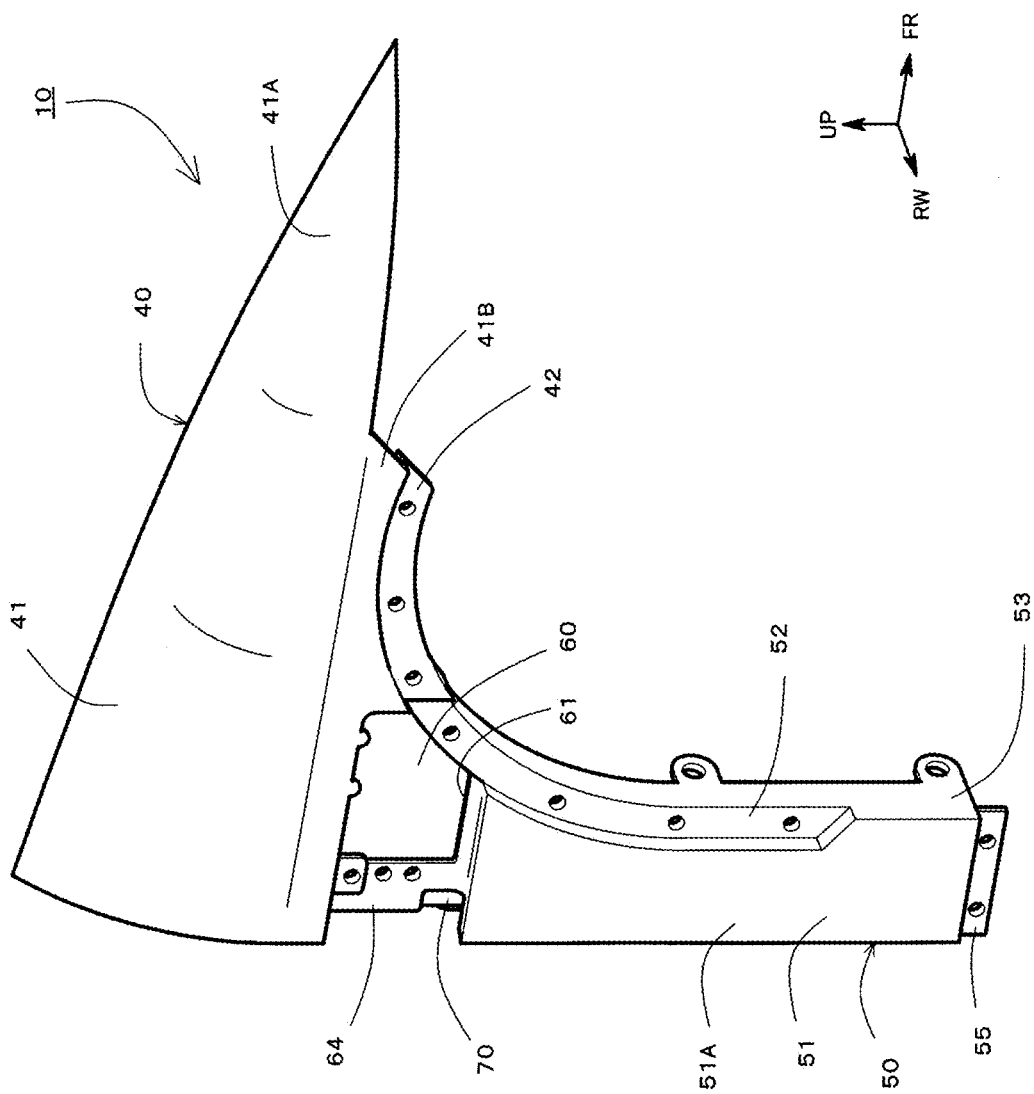
FIG. 3 is a perspective view showing the front fender panel by way of example.
Figure 4:
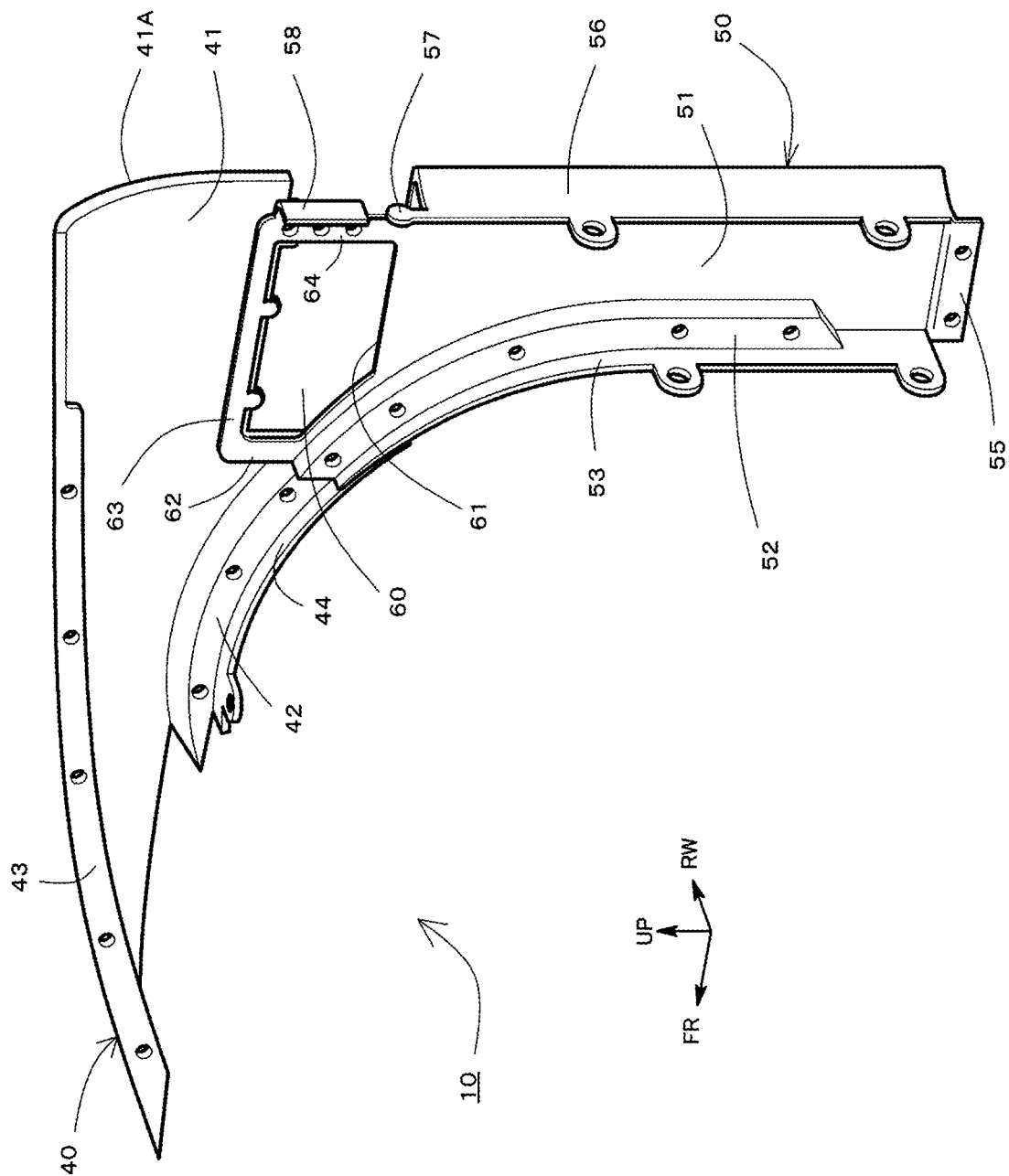
FIG. 4 is a perspective view of the front fender panel as seen from a direction opposite that of FIG. 3.

FIGS. 3 and 4 show, by way of example, perspective views of the front fender panel alone, which is one part of the outer panel structure according to the present embodiment. As a vehicle outer panel, the front fender panel 10 comprises the fender panel upper part 40, which is the upper part of a divided member, and the fender panel lower part 50, which is the lower part of the divided member.

The fender panel upper part 40 is composed of, for example, a resin, a sheet metal such as an aluminum panel, or the like. The fender panel upper part 40 comprises a main body portion 41 and flanges 42, 43, 44. The main body portion 41 includes a curved design surface 41A, and a substantially planar design surface 41B constituting a part of a side face of the vehicle.

Referring to FIG. 4, the flange 43 is provided at an upper end of the design surface 41A. The flange 43 is shaped so as to face inward in the vehicle width direction. The flange 43 is perforated in its thickness direction with a plurality of fastening holes. These fastening holes are aligned with fastening holes (not shown in drawing) in the apron upper member 23 (see FIG. 2), and fastening members such as clips are inserted into these holes, whereby the fender panel upper part 40 is fastened to the apron upper member 23.

Referring to FIGS. 3 and 4, the flange 42 is provided at a lower end of the design surface 41B, and has an arcuate shape along the shape of the front tire 16 (see FIG. 1). The flange 42 faces the vehicle width direction. The fender panel upper part 40 is shaped such that the flange 42 is recessed inward in the vehicle width direction from the design surface 41B.

The flange 42 is perforated in its thickness direction with a plurality of fastening holes. Into these fastening holes, clips (not shown in drawing) of a front fender molding 19 (see FIG. 1) are inserted. Further, referring to FIG. 4, rear end portions of the flanges 42, 44 are overlapped on an upper end portion of flanges 52, 53 of the fender panel lower part 50.

The flange 44 is bent from the flange 42, and is provided to extend in an arcuate shape along the shape of the front tire 16 (see FIG. 1), as with the flange 42. The flange 44 faces the tread surface of the front tire 16, and is perforated in its thickness direction with a plurality of fastening holes. Into these fastening holes, clips (not shown in drawing) of a front fender liner 15 (see FIG. 1) are inserted.

As described above, a cross-sectional L-shape is formed by the flanges 42, 44. A front end portion of the reinforcement bracket 90 (see FIG. 8) is placed in contact with and along this shape.

Referring to FIGS. 3 and 4, a rear lower-end portion of the main body part 41 is overlapped on an upper portion of the frame part 61 of the box opening 60. More specifically, referring to FIG. 4, a front crosspiece 62 and an upper crosspiece 63, which constitute part of the frame structure of the frame part 61, are overlapped with the lower end portion of the main body part 41. These overlapped parts are joined together by welding or the like. The front crosspiece 62 and the upper crosspiece 63 are thereby reinforced.

<Fender Panel Lower Part>

Referring to FIGS. 3 and 4, the fender panel lower part 50 comprises a main body portion 51 and flanges 52, 53, 55, 56. The main body portion 51 includes a design surface 51A. The fender panel upper part 40 and the fender panel lower part 50 are assembled to a vehicle body such that the design surface 51A and the design surface 41B of the fender panel upper part 40 are arranged in the same plane.

The flange 55 is connected to a lower end of the main body portion 51. The fender panel lower part 50 is shaped such that the flange 55 is recessed inward in the vehicle width direction from the main body portion 51. The flange 55 is perforated in its thickness direction with fastening holes. Into the fastening holes, clips (not shown in drawing) of a mudguard 18 (see FIG. 1) are inserted.

Referring to FIGS. 3 and 4, the flange 52 is connected to a front end of the design surface 51A, and has an arcuate shape along the shape of the front tire 16 (see FIG. 1). The flange 52 faces the vehicle width direction. Further, the fender panel lower part 50 is shaped such that the flange 52 is recessed inward in the vehicle width direction from the design surface 51A.

The flange 52 is perforated in its thickness direction with a plurality of fastening holes. As in the flange 42, clips (not shown in drawing) of the front fender molding 19 (see FIG. 1) are inserted into these fastening holes.

The flange 53 is bent from the flange 52, and is provided to extend in an arcuate shape along the shape of the front tire 16 (see FIG. 1), as with the flange 52. The flange 53 faces the tread surface of the front tire 16, and is perforated in its thickness direction with a plurality of fastening holes. Into these fastening holes, clips (not shown in drawing) of the front fender liner 15 (see FIG. 1) are inserted.

As described above, a cross-sectional L-shape is formed by the flanges 52, 53. The reinforcement bracket 90 (see FIG. 8) is placed in contact with and along this shape.

The fender panel lower part 50 is perforated in a part of an upper end portion thereof and thereby includes the frame part 61 formed therein. For example, as illustrated in FIG. 4, an upper part of the main body portion 51 is perforated, and the box opening 60 is thereby formed. The frame part 61 of the box opening 60 is substantially rectangular. A front lower-end portion of the frame part 61 is in close proximity to the flanges 42, 52, and has an arcuate shape along these flanges.

The box opening 60 is formed at end edges of the fender panel lower part 50, and comprises the front crosspiece 62, the upper crosspiece 63, and a rear crosspiece 64, all of which have a narrow width. As described above, the front crosspiece 62 and the upper crosspiece 63 are reinforced by being overlapped and welded together with the lower end portion of the fender panel upper part 40.

The rear crosspiece 64 comprises a flange 58 as shown by way of example in FIG. 8. Further, a flange 56 is provided at a rear end of the main body portion 51. To the rear crosspiece 64, a bracket 70 is welded, for example (or may be fastened). Further, by means of welding points shown by X marks in the drawing, the flanges 56, 58 are joined together via the bracket 70. In this way, the rear crosspiece 64 is reinforced by the bracket 70.

<Charging Receiver Module>

Referring to FIGS. 3 and 7, the charging receiver module 80 is inserted and fixed in the frame part 61 of the front fender panel 10, which is the outer panel. In short, the charging receiver module 80 is an assembly having a charging inlet function for receiving external charging, and is, for example, capable of being attached to and detached from the front fender panel 10 using tools or the like.

The charging receiver module 80 comprises the box 81, the charging inlet 82, and the lid 83. The box 81 is fitted in the box opening 60 of the frame part 61. For example, the box 81 is fastened to the frame part 61 using fastener such as clip or bolt/nut fastening.

Figure 5:
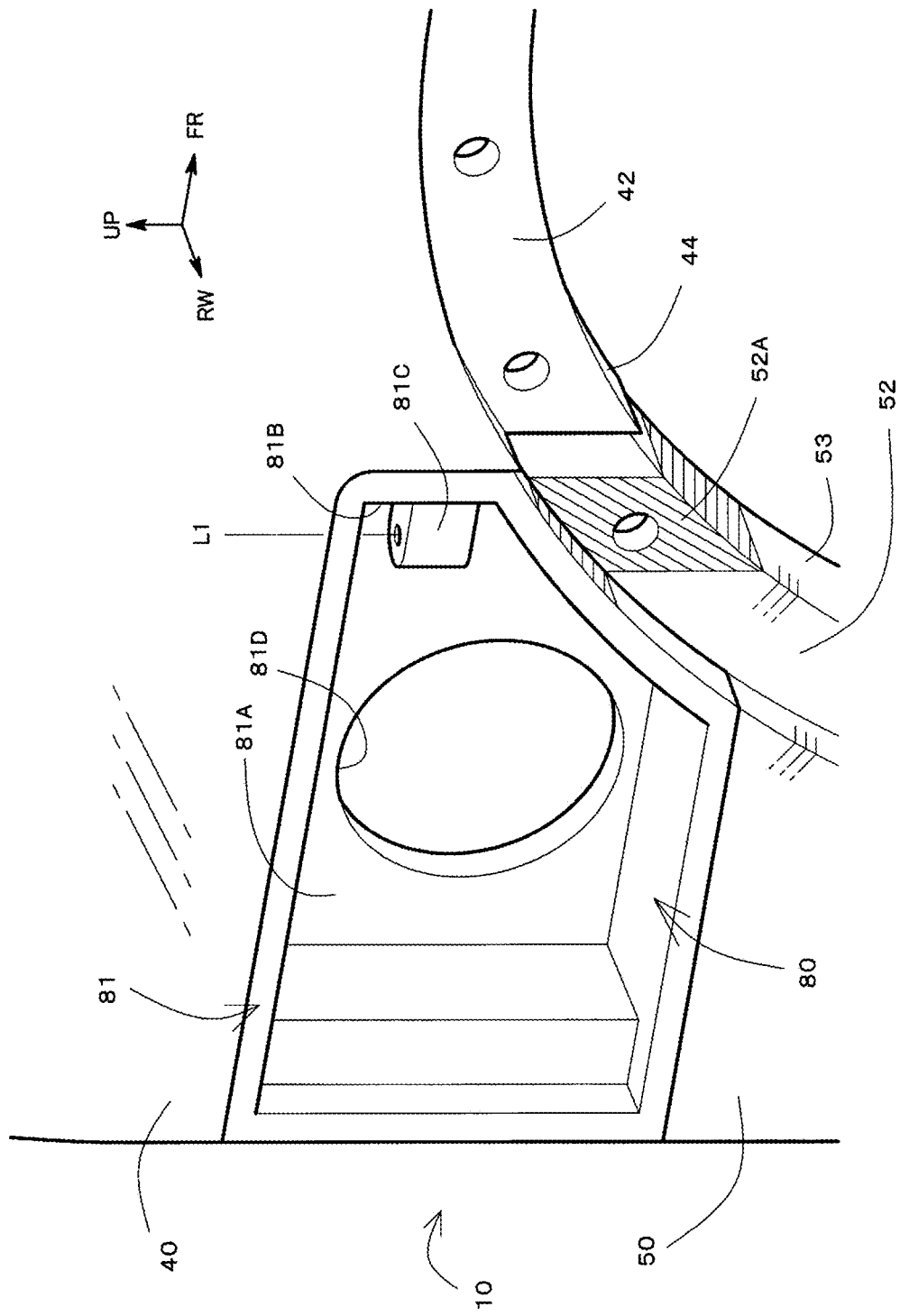
FIG. 5 is a perspective view illustrating a step (1 of 3) for mounting a charging receiver module to the front fender panel.

The box 81 has a shape conforming to the frame part, and opens in the vehicle width direction. The box 81 comprises a bottom plate 81A, which is recessed inward in the vehicle width direction from the fender panel upper part 40 and the fender panel lower part 50, and side plates that surround the bottom plate 81A. Referring to FIG. 5, among the side plates, on a side plate 81B located in the vehicle front direction, a fixed hinge part 81C is provided. For example, the fixed hinge part 81C is vertically perforated with a pin opening.

Figure 6:
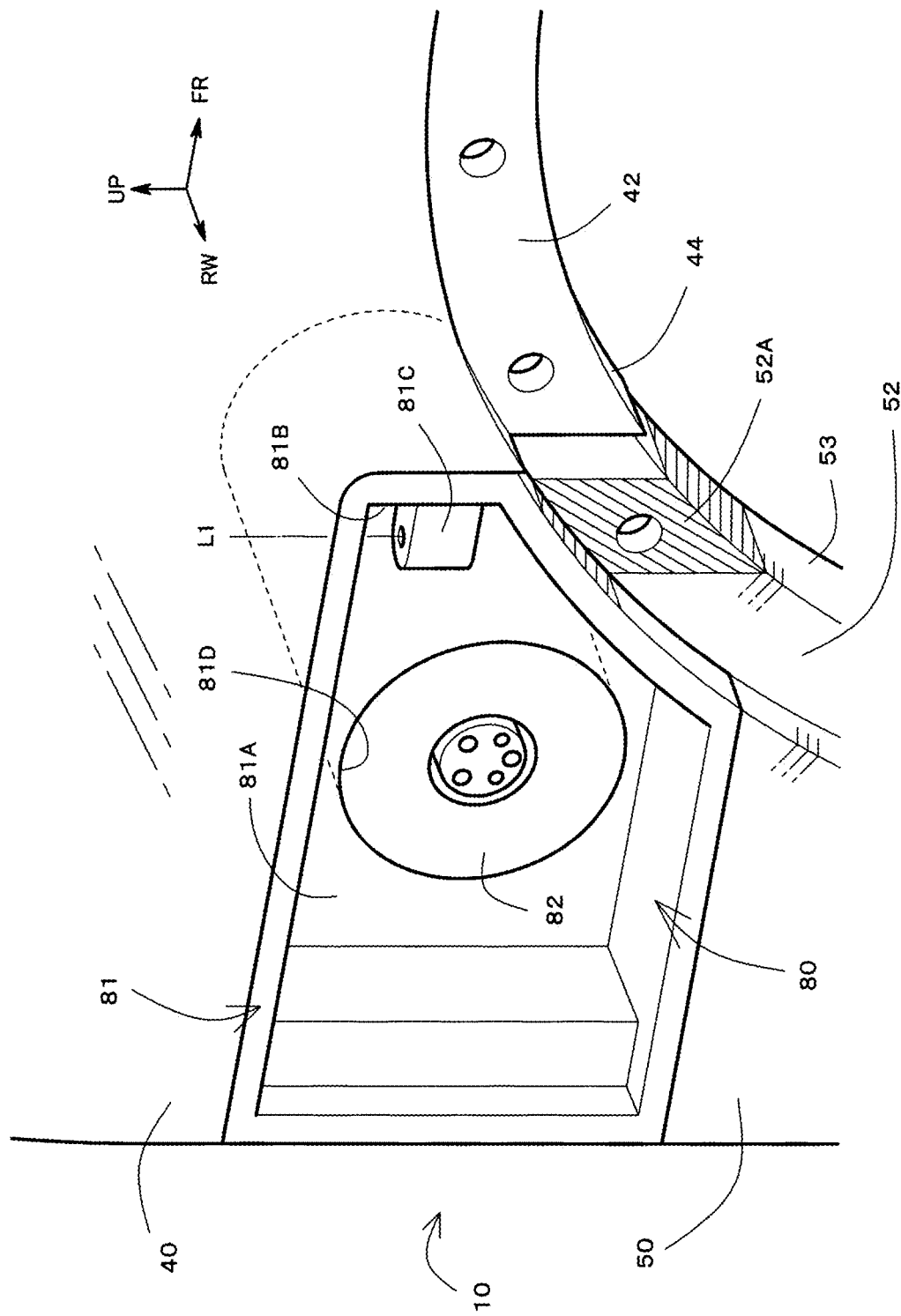
FIG. 6 is a perspective view illustrating a step (2 of 3) for mounting the charging receiver module to the front fender panel.

Further, the bottom plate 81A of the box 81 is perforated in its thickness direction with an inlet opening 81D. Referring to FIG. 6, the charging inlet 82 is inserted and fixed in the inlet opening 81D.

Referring to FIGS. 6 and 7, the lid 83 is a cover member that covers the opening of the box 81. The lid 83 comprises a movable hinge part 83A, which is aligned with the fixed hinge part 81C. By assembling the movable hinge part 83A to the fixed hinge part 81C, the opening/closing hinge axis L1 is provided in the charging receiver module 80 at its part located in the vehicle front direction. The lid 83 is capable of performing opening and closing movements about the opening/closing hinge axis L1.

FIG. 8 shows, by way of example, a perspective view of the front fender panel 10 as seen from a direction opposite that of FIG. 7 (i.e., from a back surface). In FIG. 8, illustration of the charging inlet 82 is omitted for the purpose of achieving visibility of the lid 83 from the back surface of the front fender panel 10.

The lid 83 is pivotable about the opening/closing hinge axis L1, and with this arrangement, the box 81 is opened and closed. While the lid 83 is in an open state, when a vehicle user or the like leans on the lid 83 from above in a manner of, for example, using the lid as an armrest, a downward load F1, which works to tilt the opening/closing hinge axis L1 outward in the vehicle width direction, is input to the lid 83.

At that time, in accordance with the tilting of the opening/closing hinge axis L1, a load which works to cause inward denting in the vehicle width direction is input to a part of the fender panel lower part 50 located below the opening/closing hinge axis L1 in terms of the vehicle height direction, which is, for example, a part 52A below the axis in FIG. 5. When such a load is input and an inwardly denting deformation (or bending deformation) in the vehicle width direction occurs in the part 52A below the axis, there is a risk that, for example, fastening with the front fender molding 19 (see FIG. 1) may become disengaged.

In view of this, in the outer panel structure according to the present embodiment, a reinforcement bracket (see FIG. 8) is mounted to the part 52A below the axis. For example, the bracket 90 is mounted to (or provided as a backing on) a back surface (or hidden surface) of the front fender panel 10 located behind the design surface. Denting deformation in the part 52A below the axis is thereby suppressed.

<Bracket>

Figure 9:
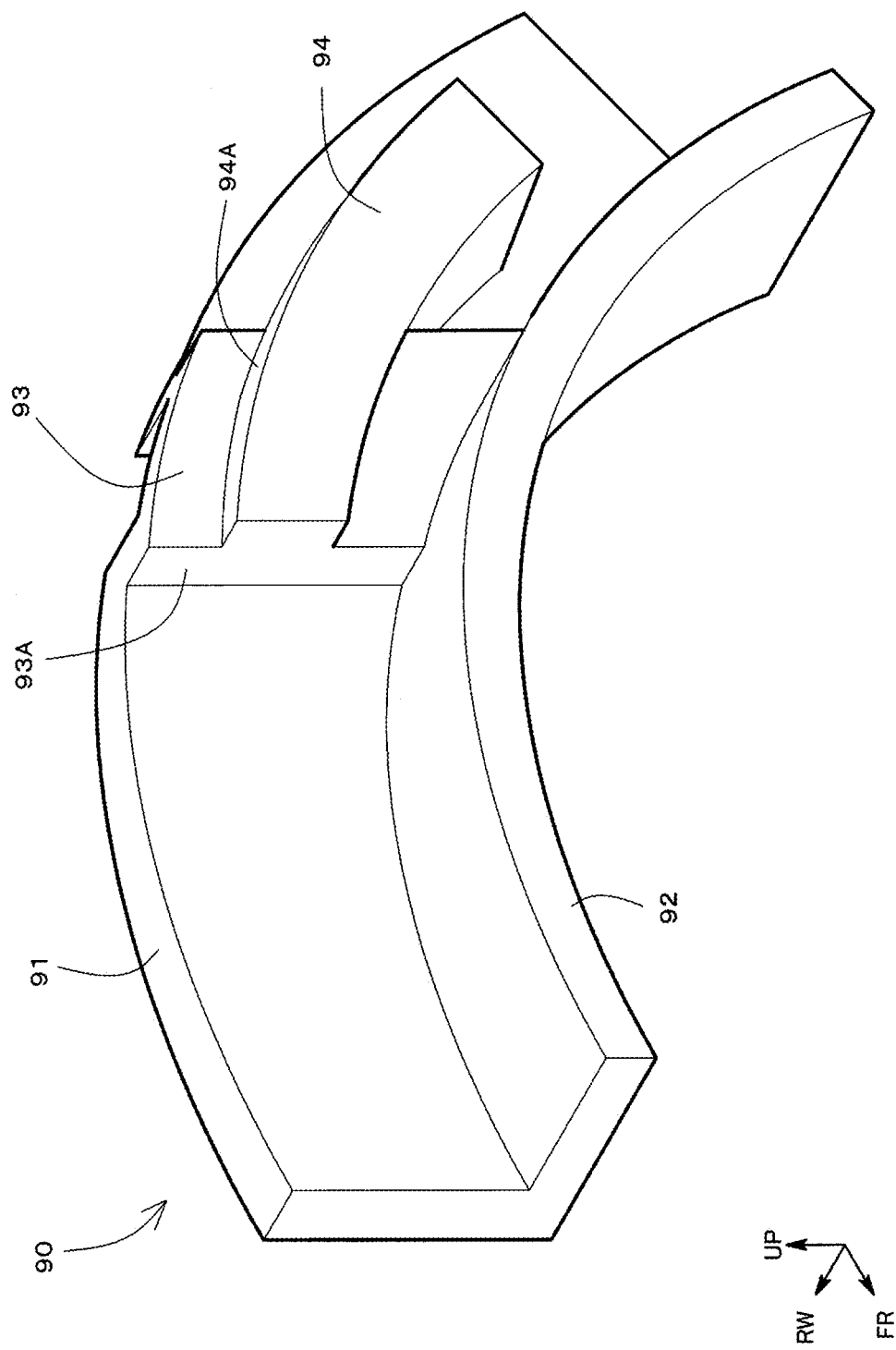
FIG. 9 is a perspective view of the bracket alone.

FIG. 9 shows a perspective view of the bracket 90 alone by way of example. The bracket 90 is a member having an L-shaped cross section, and comprises a support segment 91 and a support segment 92 that is bent substantially perpendicularly from the support segment 91. By configuring the bracket to have an L-shaped cross section, a ridgeline is formed, which is a borderline between the support segments 91, 92, so that resistance to load is increased as compared to the case where the bracket 90 has a planar shape.

The bracket 90 is shaped to have an arcuate shape along the shape of the flanges 42, 44 of the fender panel upper part 40 (see FIG. 8) and the flanges 52, 53 of the fender panel lower part 50. Further, the bracket 90 is shaped such that the bending angle between the support segments 91, 92 is equal to the bending angle between the flanges 42, 52 and the flanges 44, 53.

The support segments 91, 92 of the bracket 90 are arranged to extend across a rear end portion of the flanges 42, 44 and a front end portion of the flanges 52, 53, and placed in contact with these flanges. For example, by means of welding points shown by X marks in the drawing, the support segments 91, 92 are welded to the flanges 42, 44, 52, 53.

Since the bracket 90 is shaped to conform along the cross-sectional L-shape formed by the flanges 42, 52 (i.e., the first plate portion) facing in the vehicle width direction and the flanges 44, 53 (i.e., the second plate portion) bent from the flanges 42, 52, interference with components around the flanges 42, 44, 52, 53 is reduced.

Further, for example, the support segment 91 is set to have a width that does not exceed a width of the flanges 42, 52, and the support segment 92 is set to have a width that does not exceed a width of the flanges 44, 53. By configuring the bracket 90 to have a size that fits within the flanges 42, 44, 52, 53, interference with components around the flanges 42, 44, 52, 53 is reduced.

Referring to FIG. 9, for example, the support segment 91 comprises a vertical bead 93 and a horizontal bead 94, which project inwardly in the vehicle width direction from the support segment 91. For example, the bracket 90 is shaped such that both of the vertical bead 93 and the horizontal bead 94 have a shape of a rectangular groove having a H-shaped cross section. The vertical bead 93 and the horizontal bead 94, together with the flanges 42, 52, form a closed cross-section structure. With this, resistance to inward bending load in the vehicle width direction, as described below, is increased (as compared to the case where the closed cross-section structure is not provided).

Further, for example, the bracket 90 is shaped such that parts of the horizontal bead 94 and the vertical bead 93 intersect and overlap each other. For example, a T-shaped bead structure is obtained by configuring one lengthwise end of the horizontal bead 94 to coincide with a side plate 93A of the vertical bead 93.

Further, in order to obtain ridgelines in this intersecting structure, the beads are shaped such that, for example, the size of projection (i.e., the groove depth) of the horizontal bead 94 is greater than that of the vertical bead 93.

For example, the vertical bead 93 and the horizontal bead 94 are positioned to overlap the fastening holes provided in the flanges 42, 52. With this arrangement, since the clips inserted in the fastening holes are inserted into the grooves of the vertical bead 93 and the horizontal bead 94, fastening work can be performed without interference by the bracket 90.

Referring to FIGS. 5 and 8, for example, the vertical bead 93 is positioned at the part 52A of the flange 52 below the axis. In other words, the vertical bead 93 is positioned at an intersection point between the flange 52 and the opening/closing hinge axis L1.

Referring to FIG. 8, when the downward load F1 is input to the lid 83, inwardly bending load in the vehicle width direction, such as those shown for example as load F2 and load F3, is input to the part 52A below the axis. Here, for example, a side plate 94A of the horizontal bead 94 struts against the load F2 which works to cause bending deformation in the vehicle longitudinal direction, and thereby suppresses deformation of the part 52A below the axis. Further, the side plate 93A of the vertical bead 93 struts against the load F3 which works to cause bending in the vehicle vertical direction, and thereby suppresses deformation of the part 52A below the axis.

Other Embodiments

Figure 10:
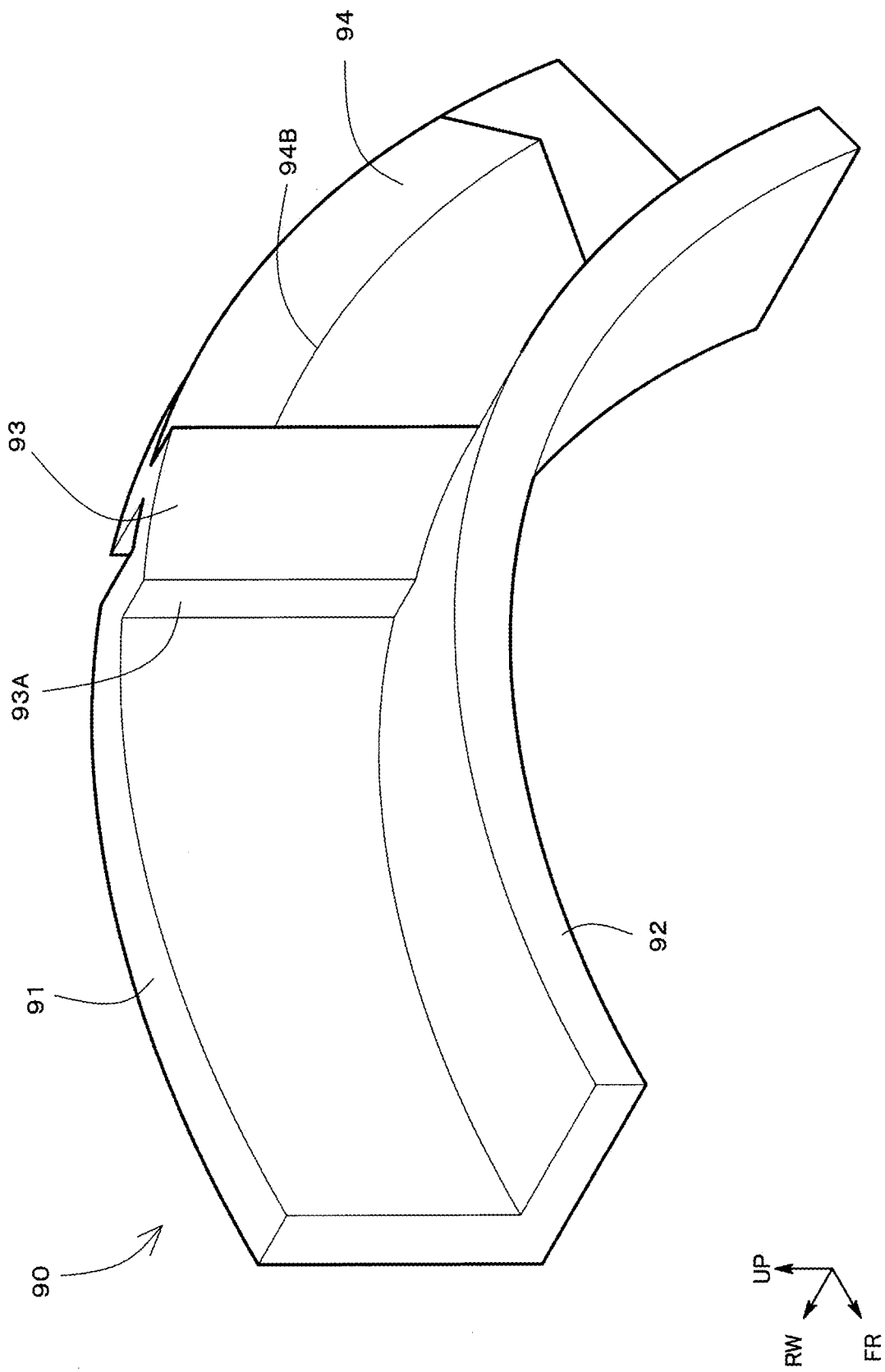
FIG. 10 is a perspective view showing another example of the bracket alone.

FIG. 10 shows another example of the bracket 90 according to the present embodiment. In this example, as shown by a ridgeline 94B, a horizontal bead 94 having a cross section of a gable roof shape projects inwardly in the vehicle width direction. For example, in this example also, the horizontal bead 94 struts against the load F2 which works to cause bending deformation in the vehicle longitudinal direction, and thereby suppresses deformation of the part 52A below the axis.

Although the front fender panel 10 is referred to as the panel member of the outer panel structure in the above-described embodiment by way of example, the outer panel structure according to the present disclosure is not limited to this embodiment. For example, the outer panel structure may comprise a rear fender panel (which is also referred to as a quarter panel) instead of the front fender panel. In that case, a frame part for a charging receiver module 80 is similarly formed in the rear fender panel, and a bracket 90 is mounted to a part located below an opening/closing hinge axis L1 of the charging receiver module 80 in terms of the vehicle height direction.

Although in the above-described embodiment the charging receiver module 80 is referred to as a part of the outer panel structure by way of example, the outer panel structure according to the present disclosure is not limited to this embodiment. For example, the outer panel structure may comprise a fuel receiver module instead of the charging receiver module. For example, the fuel receiver module comprises a fuel inlet instead of the charging inlet 82. In that case, a bracket 90 is similarly mounted to a part located below an opening/closing hinge axis L1 of the fuel receiver module in terms of the vehicle height direction.

The present disclosure is not limited to the present embodiments described above, and includes all changes and modifications without departing from the technical scope or the essence of the present disclosure defined by the claims.

The invention claimed is:

1. An outer panel structure, comprising:
an outer panel, which is provided at a side part of a vehicle, and in which a frame part is formed by perforating a part thereof in a thickness direction; and
a charging receiver module or fuel receiver module inserted and fixed in the frame part, wherein
the charging receiver module or fuel receiver module comprises a lid that can be opened and closed,
the outer panel structure further comprises a reinforcement bracket mounted to the outer panel at a part located below an opening/closing hinge axis of the lid in terms of a vehicle height direction,
the outer panel is a fender panel,
the frame part is formed in a position above a tire,
the fender panel comprises, as a structure located near the tire, a part having an L-shaped cross section, which includes a first plate portion facing a vehicle width direction and a second plate portion bent from the first plate portion, and
the reinforcement bracket has an L-shaped cross section conforming along the first plate portion and the second plate portion.

2. The outer panel structure according to claim 1, wherein
the reinforcement bracket comprises a support segment placed in contact with the outer panel, and a bead projecting in a vehicle width direction from the support segment, and
the bead comprises a vertical bead extending in the vehicle height direction and a horizontal bead extending in a vehicle longitudinal direction.

* * * * *